United States Patent [19]
Ennis et al.

[11] Patent Number: 4,749,751
[45] Date of Patent: Jun. 7, 1988

[54] PROCESS FOR BIMODAL CHLORINATION OF POLYETHYLENE

[75] Inventors: Royce E. Ennis, Beaumont, Tex.; Wolfgang Honsberg, Wilmington, Del.

[73] Assignee: E. I. Du Pont de Nemours and Company, Wilmington, Del.

[21] Appl. No.: 75,824

[22] Filed: Jul. 20, 1987

[51] Int. Cl.$^4$ .............................................. C08L 23/28
[52] U.S. Cl. ................................... 525/192; 525/194; 525/240; 525/334.1
[58] Field of Search ................... 525/192, 333.9, 334.1

[56] References Cited

U.S. PATENT DOCUMENTS

| | | | |
|---|---|---|---|
| 2,920,064 | 1/1960 | Baptist et al. | 525/334.1 |
| 3,475,401 | 10/1969 | Ben-Moshe et al. | 525/334.1 |
| 3,551,526 | 12/1970 | Trieschmann et al. | 260/897 |
| 4,280,940 | 7/1981 | Klug et al. | 525/192 |

FOREIGN PATENT DOCUMENTS 57-119943 1/1981 Japan.
57-102936 6/1982 Japan.
57-128730 8/1982 Japan.

*Primary Examiner*—Carman J. Seccuro

[57] ABSTRACT

A process is disclosed for producing a blend of chlorinated low density polyethylene and chlorinated high density polyethylene wherein the polyethylenes are placed in a solvent and the temperature raised to a point where the low density polyethylene goes into solution and the high density polyethylene does not go into solution. The low density polyethylene is chlorinated up to the desired level and then the temperature is raised to dissolve the high density polyethylene and chlorination of both polyethylenes is continued to the desired level.

3 Claims, No Drawings

PROCESS FOR BIMODAL CHLORINATION OF POLYETHYLENE

FIELD OF THE INVENTION

The present invention relates to a solution process for chlorinating blends of high and low density polyethylene to different levels of chlorination. Chlorinated polyethylene is a well known commercially available elastomer.

PRIOR ART

U.S. Pat. No. 3,551,526 discloses blends of 10 to 90 wt. % chlorinated low density polyethylene having a chlorine content of 5 to 50 wt. % and 90–100% chlorinated high density polyethylene having a chlorine content of 10 to 30 wt. %.

J57102936, J57119943 and J57128730 disclose blends of chlorinated high density polyethylene and chlorinated low density polyethylene.

SUMMARY OF THE INVENTION

The present invention relates to a process for chlorinating two or more polyethylenes of different densities and crystallinity. The chlorination is done by adding the two or more polyethylenes of different densities to a solvent. The mixture is then heated to a temperature at which the lower density polyethylene dissolves and the higher density polyethylene does not. The solution is then chlorinated. After reaching the desired chlorination level of the low density polyethylene, the temperature is raised to a temperature sufficiently high to dissolve the high density polyethylene and chlorination is continued to the desired level. The product has higher crystallinity and hence tensile strength than a similar product which is chlorinated all at once.

DETAILED DISCLOSURE

The process of the present invention comprises suspending two or more polyethylene resins in pellet or other solid form which polyethylenes have differing degrees of crystallinity (density) and therefore different dissolving temperatures in a solvent such as carbon tetrachloride, and chlorinating in two stages. The reactor temperature and pressure are adjusted such that the less crystalline (lower density) polyethylene resin is in solution and higher crystalline (higher density) polymer(s) remain undissolved. The chlorination in the first step is accomplished by adding chlorine gas and an initiator such as azobisisobutyronitrile, at constant temperature and pressure with agitation such that only the lower crystalline polymer(s) is in solution and therefore receives most of the chlorination. The highly crystalline pellets remain in suspension and are chlorinated only to a slight degree on the pellet surface. After the desired amount of chlorine has been substituted during the first step (10-35 wt. % on the dissolved polymer) the pressure is increased and the temperature is allowed to increase, from heat of reaction and reactor jacket steam pressure, until the higher crystalline (higher density) polymer(s) is in solution. The second step chlorination is then accomplished by adding the final amount of chlorine and initiator to the homogeneous blend solution until the final desired amount of chlorine is substituted. In the second stage, chlorine is substituted to both the lower and higher crystalline polymers such that a bimodal chlorine distribution is achieved. Generally an overall chlorination level of 20 to 40 wt. % chlorine in the blend is achieved.

Generally suitable solvents for use in carrying out the process of the present invention include carbon tetrachloride, chlorinated benzene or chloroform.

Typical free radical initiators for using in the process of the present invention include lauroyl peroxide, $\alpha,\alpha'$-azobisisobutyronitrite, and $\alpha,\alpha'$-azodicyclohexenecarbonitrile.

The difference in the amount of chlorination applied to the high density polyethylene and the low density polyethylene contols whether the product blend is suitable for thermoplastic or thermosetting applications. Generally, if the high density polyethylene contains less than about 15 wt. % chlorine, the product will be a thermoplastic. If the high density polyethylene contains more than about 20 wt. % chlorine, the product will be useful as a thermosetting elastomer and needs to be processed on equipment normally used for rubber and is then crosslinked using a crosslinking agent such as a peroxide or sulfur as is conventional in the art.

Generally from 30–90 wt. % low density polyethylene and from 70 to 10 wt. % high density polyethylene is used. The low density polyethylene is preferably of the linear copolymer type.

Optionally, one of the polyethylenes can have grafted thereto an unsaturated dicarboxylic acid or anhydride containing 4–6 carbon atoms such as maleic anhydride, maleic acid or fumaric acid. The grafted polyethylenes can be prepared by the process disclosed in Re 31,680.

Generally, the first stage chlorination is carried out at 90° to 97° C. to achieve 30 to 40 and preferably 33-35 wt. % chlorination of the low density polyethylene and the second stage chlorination is carried out at 100° to 110° C. Generally the pressure used for the chlorination is 55 to 175 KPa.

Generally all of the lower density polyethylene is in solution during the first stage of the chlorination. During the second stage of the chlorination from both the lower density polyethylene and the higher density polyethylene are in solution.

The cochlorinated polyethylene blends produced by the process of the present invention exhibit improved tensile strength over polyethylene which has been chlorinated in one stage as well as blends of separately chlorinated high and low density polyethylene. This improved tensile strength is apparently due to the comparatively high crystallinity of the high density polyethylene which has received a relatively low level of chlorination.

EXAMPLE 1

A ten-gallon, steam jacketed reactor, fitted with a water cooled condensor and agitator is charged with 2 pounds (0.9 kg) high density polyethylene having a melt index of 0.85 and density 0.960; 2 pounds (0.9 kg) linear low density polyethylene having melt index 0.75 and density 0.918 and 70 pounds (31.8 kg.) carbon tetrachloride. The suspension of polyethylene pellets in carbon tetrachloride is heated under 8 psig (55 kPa) reactor pressure until the reactor temperature reaches 90° C. Agitation is continued at this temperature and pressure for 30 minutes to allow complete dissolution of the low density polyethylene. $\alpha,\alpha'$-Azobisisobutyronitrile, 1% in chloroform, is added at a rate of 0.25 gm/minute continuously for five minutes prior to chlorination and throughout the reaction. Chlorine gas is added to the reaction mass at a rate of 1 pound (0.45 kg)/hour at 90°

C. until 1.88 pounds of chlorine has been added. The pressure is then increased to 25 psig (172 kPa) and the reaction temperature is increased to 110° C. and 1.0 pound (0.45 kg) additional chlorine is added. The polymer is worked up in the usual manner by reducing the pressure to atmospheric to remove residual HCl and the polymer is isolated from the solvent by evaporating the solution on a system of rotating drums, internally heated to 160° C. The resulting polymer contains 24.95% combined chlorine, delta H-13.5 cal/gm, a melt temperature of 112° C. and is thermoplastic.

EXAMPLE 2

A ten-gallon reactor as in Example 1 is charged with 1.8 (0.82 kg) pounds high density polyethylene of melt index 0.85, density 0.960; 1.8 pounds (0.82 kg) high density linear low density polyethylene of melt index 0.25 density (0.935); 0.4 pounds (0.1 kg) grafted polyethylene having a density of 0.960 a melt index of 2.0 and containing 1.0 wt. % grafted maleic anhydride; and 70 pounds (31.8 kg) carbon tetrachloride. The suspension is heated and chlorinated in two stages as in Example 1 except 1.9 pounds (0.9 kg) of chlorine is added in the first stage and 2.8 pounds (1.27 kg) chlorine is added in the second stage. The polymer is worked up as before and contains 36.4% combined chorine. It has a crystallization temperature of 56° C. and second order transition temperatures of −20° C. and 2° C.

EXAMPLE 3

The reaction is carried out as in example 2 except that 1.3 kg of linear low density polyethylene having melt index 0.25 and density 0.935; 0.36 kg of high density polyethylene having a melt index of 0.85 and density of 0.960; and 0.18 kg of a maleic anhydride grafted polyethylene having a density of 0.960, melt index of 2.0, and a maleic anhydride content of 1% are used. Chlorine gas added during the first stage at 92° C. is 1.3 kg and the chlorine gas added during the second stage at 110° C. is 0.92 kg. The chlorine content of the final polymer is 36.7 and a crystallization temperature of 51° C. was measured.

EXAMPLE 4

The reaction is carried out as in Example 2 except that 1.64 kg of a polyethylene having a melt index of 0.25 and a density of 0.935 and 0.18 kg of a maleic anhydride grafted polyethylene having a melt index of 2.0, a density 0.960 and containing 1.0 wt. % grafted maleic anhydride was used. Chlorine gas added during the first stage at 93° C. was 1.5 kg and chlorine gas added during the second stage at 110° C. was 0.68 kg. The isolated product had a chlorine content of 36.7% and a crystallization temperature of 44° C.

EXAMPLE 5

(Control)

The reaction is carried out as in Example 2 except that 1.64 kg of linear low density polyethylene having melt index of 0.25 and a density of 0.935 and 0.18 kg of a maleic anhydride grafted high density polyethylene having a melt index of 2, density of 0.960, and containing 1% grafted maleic anhydride is used. The blend of resins is completely dissolved at 110° C. and 2.6 atmospheres pressure (0.26 MPa) and the entire chlorination is carried out at that pressure and temperature. After 2.2 kg of chlorine gas is added, the polymer is found to contain 36.3% combined chlorine and has a crystallization temperature of 24° C.

The polymers of Examples 2, 3 and 5 were compounded on a rubber mill at 160° C. with the ingredients shown in Table I. Samples were prepared and tested for Mooney viscosity and stress/strain properties according to ASTM D-1646-81 and D-412, respectively. Results are shown in Table I.

TABLE I

|  | Example 2 | Example 3 | (Control) Example 5 |
|---|---|---|---|
| Polymer | 100 | 100 | 100 |
| MgO | 6.5 | 6.5 | 6.5 |
| Flectol H Plasticizer | 0.2 | 0.2 | 0.2 |
| Garoflam SBP90 | 5 | 5 | 5 |
| FEF Carbon Black | 40 | 40 | 40 |
| Calcium Carbonate | 70 | 70 | 70 |
| Dioctyl Phthalate | 30 | 30 | 30 |
| Triallylcyanurate | 2.5 | 2.5 | 2.5 |
| Dicumyl Peroxide | 7.5 | 7.5 | 7.5 |
| Mooney Viscosity (ASTM D-1646-81) | | | |
| 121° C. | 34 | 35 | 22 |
| Stress/Strain Properties (ASTM D-412) Press-Cure 10 min/180° C. | | | |
| $M_{100}$(MPa) | 5.4 | 5.2 | 4.6 |
| $T_B$(MPa) | 14.5 | 13.7 | 11.8 |
| $E_B$(%) | 315 | 285 | 280 |
| Steam-Cure 90 Sec/1.6 MPa | | | |
| $M_{100}$(MPa) | 6.1 | 6.2 | 5.6 |
| $T_B$(MPa) | 18.3 | 16.1 | 12.8 |
| $E_B$(%) | 285 | 260 | 255 |

Examples 2 and 3 (the invention) show a clear superiority in both tensile strength (TB) and Mooney viscosity as compared with Control Example 5.

EXAMPLE 6

The reaction is carried out as in Example 2 except that only two polyethylene resins are used consisting of 0.9 kg linear low density polyethylene of melt index 0.25 and density 0.935 and a 0.9 kg high density polyethylene of melt index 0.85 and density 0.960. One kg of chlorine gas is added during the first stage and the soluble polymer was found to contain 35% Cl. During the second stage of chlorination 1.2 kg of chlorine gas is added at 110° C. so that the total amount chlorine added is 2.2 kg. The isolated polymer contains 36.3% chlorine and has a crystallization temperature of 53° C. Second order transition temperatures are found at −24° C. and 2° C.

EXAMPLE 7

(Control)

A 10-gallon reactor, fitted as in example 1 is charged with 1.8 kg linear low density polyethylene having a melt flow index of 0.25 and a density of 0.935 and 27 kg carbon tetrachloride solvent. The suspended pellets are heated under 2.6 atmospheres reactor pressure (0.26 MPa) with a steam jacket using 2.6 atmospheres steam pressure(0.26 MPa), until the reactor contents reach 110° C. Agitation is continued at this temperature and pressure for 30 minutes to allow complete dissolution of the polyethylene. α,α'-Azobisisobutyronitrile, 1% in chloroform, is added at a rate of 0.25 grams/minute for 5 minutes to initiate the chlorination reaction and is continued at a rate of 0.05 grams/minute, α,α'-azobisisobutyronitrile during the chlorination reaction. Chlorine gas is added at a rate of 0.45 kg/hr while the reaction temperature and pressure remain constant until 2.2 kg of chlorine has been added. The polymer is isolated from the solvent as in example 1 and found to contain 36.2% combined chlorine. Thermal analysis of the polymer shows a crystallization temperature at 19° C. and a single secondary transition temperature at −15° C.

EXAMPLE 8

(Control)

The reaction is carried out as in example 7 except that high density polyethylene is used which has a melt index of 0.85 and a density of 0.96. The isolated polymer contained 35.8% chlorine and had a crystallization temperature of 28° C. and a second order transition temperature at −11° C.

Polymers 6,7 and 8 were compounded on a rubber mill at 160° C. with the ingredients shown in Table II. Samples were prepared and tested for stress/strain properties and Mooney viscosity according to ASTM D-412 and D-1646-81, respectively.

TABLE II

|  | Example 6 | (Control) Example 7 | (Control) Control 8 |
| --- | --- | --- | --- |
| Polymer | 100 | 100 | 100 |
| MgO | 6.5 | 6.5 | 6.5 |
| Flectol H Plasticizer | 0.2 | 0.2 | 0.2 |
| Garoflam SBP90 | 5 | 5 | 5 |
| FEP Carbon Black | 40 | 40 | 40 |
| Calcium Carbonate | 70 | 70 | 70 |
| Dioctyl Phthalate | 30 | 30 | 30 |
| Triallylisocyanurate | 2.5 | 2.5 | 2.5 |
| Dicumyl Peroxide | 7.5 | 7.5 | 7.5 |

TABLE II-continued

|  | Example 6 | (Control) Example 7 | (Control) Control 8 |
| --- | --- | --- | --- |
| | Mooney Viscosity (ASTM D-1646-81) | | |
| 121° C. | 28 | 19 | 21 |
| | Stress/Strain properties (ASTM D-412) Press Cure 10 min./180° C. | | |
| $M_{100}$ (MPa) | 4.8 | 4.6 | 4.8 |
| $T_B$ | 13.3 | 10.9 | 11.6 |
| $E_B$ (%) | 315 | 340 | 290 |
| | Steam Cure 90 Sec./1.6 MPa | | |
| $M_{100}$ (MPa) | 5.8 | 5.3 | 5.4 |
| $T_B$ (MPa) | 14.8 | 11.6 | 12.1 |
| $E_B$ (%) | 305 | 285 | 315 |

Example 6 (the invention) shows improvement in tensile strength and Mooney viscosity as compared with Control Example 7 and 8.

We claim:

1. A process comprising dissolving a low density polyethylene in an organic solvent in the presence of solid particles of a high density polyethylene, supplying chlorine to the solution in the presence of a chlorination initiator, chlorinating the dissolved polyethylene to a level of 30 to 40 percent by weight, raising the temperature of the solution to a point where the high density polyethylene dissolves, and continuing chlorination until the blend of polyethylene contains at least 20 percent by weight chlorine.

2. The process of claim 1 wherein the chlorinated blend product contains from 20 to 40 percent by weight chlorine.

3. The process of claim 2 wherein the low density polyethylene contains from about 33 to 35 weight percent chlorine when the temperature is raised to dissolve the high density polyethylene.

* * * * *